April 19, 1955     W. E. TOLLES     2,706,801
MAGNETIC FIELD COMPENSATION SYSTEM Filed Aug. 8, 1944     2 Sheets-Sheet 1

Inventor
WALTER E. TOLLES

April 19, 1955  W. E. TOLLES  2,706,801
MAGNETIC FIELD COMPENSATION SYSTEM
Filed Aug. 8, 1944  2 Sheets-Sheet 2

FIG. 2

Inventor
WALTER E. TOLLES

By F. J. Schmitt
Attorney

United States Patent Office

2,706,801
Patented Apr. 19, 1955

2,706,801

MAGNETIC FIELD COMPENSATION SYSTEM

Walter E. Tolles, Mineola, N. Y., assignor to the United States of America as represented by the Secretary of the Navy Application August 8, 1944, Serial No. 548,579

3 Claims. (Cl. 324—43)

This invention relates to magnetic field compensation systems, and more particularly to compensation systems for use in connection with aircraft-mounted portable magnetometers.

Magnetometers of the general type herein contemplated are arranged to measure changes in a magnetic field in a particular direction along which a magnetometer element is oriented. In one magnetometer of this general type, disclosed in copending application of Otto H. Schmitt Serial No. 516,612, filed January 1, 1944, now Patent No. 2,560,132, there is provided a set of magnetometer elements and means for generating a varying direct-current output proportional to changes in the magnetic field in the direction of the magnetometer elements. For certain purposes, as for example the detection of magnetic bodies from aircraft, the magnetometer elements of this system are oriented in the direction of the earth's magnetic field and are arranged to measure the small changes in the intensity of that field caused by magnetic bodies. In this application, means are provided for maintaining the orientation of the magnetometer elements parallel to the earth's magnetic field irrespective of changes in attitude of the aircraft. Such means may conveniently be of the general type disclosed in copending application of Donald G. C. Hare Serial No. 529,003, filed March 31, 1944, Magnetic Stabilization System, now Patent No. 2,689,333, in accordance with which there is provided a magnetically operated system for orienting the magnetometer elements about two axes, thereby to maintain the required alignment.

It will be understood, therefore, that in the case of an aircraft-mounted magnetometer system of the type referred to above, changes in attitude of the aircraft as it maneuvers result in changes in the relative orientation of the magnetometer elements and various magnetic members in the aircraft structure. Hence permanently magnetized members in the aircraft structure produce a "perm" field, the direction of which in respect to the magnetometer elements varies as the attitude of the aircraft changes. In addition, magnetic fields are induced in soft ferromagnetic members of the aircraft structure, the magnitude and direction of these component fields varying with the attitude of the carrier. The direction of the total induced field in rspect to the magnetometer elements also varies as the attitude of the carrier changes. An additional disturbance is caused by large conducting sheets, as for example the metal skin of the aircraft wings, in which eddy currents are produced as the carrier's attitude changes.

Fields of the origins noted above all have components in the direction of the earth's magnetic field and, therefore, in alignment with the magnetometer elements. Consequently, spurious signals appear in the output of the magnetometer system whenever the attitude of the aircraft changes. Since such signals may entirely mask output signals indicating the presence of magnetic bodies, their elimination is essential.

Various methods and devices have been proposed for the elimination of spurious signals of the types mentioned above, but these in general involve the use of auxiliary magnets, coils or permalloy strips for compensating the effects of the various components of the aircraft's magnetic field. In their use, such devices must in general be accurately positioned in respect to the magnetometer elements and this requirement may in many cases be difficult of fulfillment without adversely affecting the aerodynamic characteristics of the aircraft.

It is proposed in accordance with the present invention, therefore, to provide in combination with an aircraft-mounted magnetometer system arranged to produce a direct-current output proportional to the intensity of a magnetic field to be measured, means for generating voltages proportional to chosen individual components of disturbing magnetic fields of the aircraft, and means for introducing these voltages into the magnetometer system in such manner as to cancel out the direct-current voltages produced therein by the magnetic field of the aircraft.

In the drawings:

Fig. 2 is a schematic diagram of the compensation system of the invention; and

Figure 1:
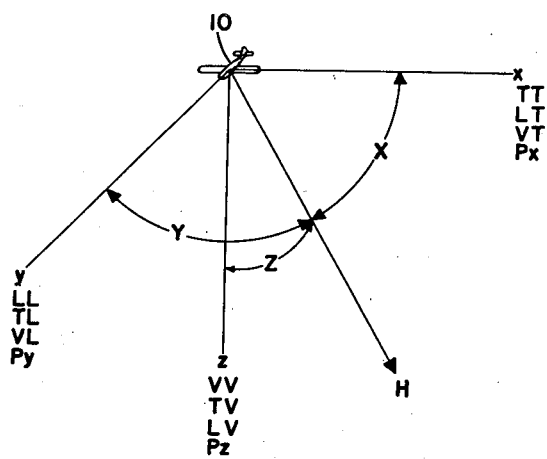
Fig. 1 is a diagram showing the various components of the magnetic field of the aircraft.
Figure 3:
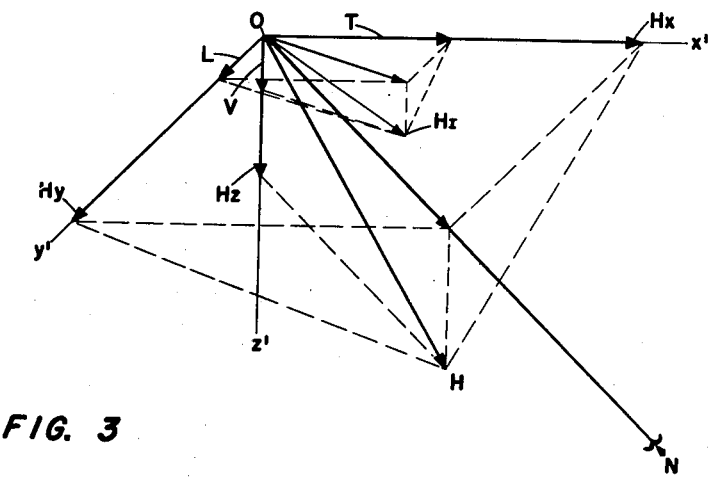
Fig. 3 is a diagram showing an example of an induced magnetic field with its components relative to the earth's magnetic field.

Referring to Figs. 1 and 3, and particularly to Fig. 1, there is shown an aircraft 10 in which is mounted a portable magnetometer system provided with means for orienting the magnetometer elements in the direction of the earth's magnetic field, indicated by the arrow marked H. A set of orthogonal axes $x$, $y$ and $z$ is chosen, the origin of these axes being at the intersection of the so-called "natural axes" of the aircraft. Thus the $x$ axis lies along the transverse axis of the aircraft, the $y$ axis along the longitudinal axis of the aircraft, and the $z$ axis along the vertical axis perpendicular to the transverse and longitudinal axes of the aircraft at their intersection. The angles between the $x$, $y$ and $z$ axes of the coordinate system and the direction of the earth's magnetic field are indicated by means of the angles X, Y and Z, respectively.

The permanently magnetized members of the aircraft structure may have practically random distribution throughout the aircraft, but the total magnetic field produced thereby may conveniently be resolved along the $x$, $y$ and $z$ axes just defined above, these components being designated as $P_x$, $P_y$ and $P_z$, respectively. The effect of these perm field components on the magnetometer system may be determined by finding their resultant $H_p$ in the direction of the earth's field H, inasmuch as the magnetometer elements are arranged to measure the field intensity only in that direction. Thus the effect of the perm field in the direction of the magnetometer $$H_p = P_x \cos X + P_y \cos Y + P_z \cos Z \qquad (1)$$

Induced fields due to soft iron or steel members in the aircraft structure may also be summed and reproduced by three virtual soft iron bars oriented respectively in the $x$, $y$ and $z$ directions, these bars being designated as transverse, longitudinal and vertical, or preferably T, L and V bars, as shown in Fig. 3. As the aircraft maneuvers, these bars produce fields in the directions of their orientation. The virtual bars T, L and V do not in general lie on the chosen axes, but are only parallel thereto. Consequently, each of the bars also produces fields in the directions of the remaining axes. Each of the field components so generated depends for its magnitude and polarity upon the relative orientation of the bar by which it is caused, and the direction of the earth's magnetic field. In addition, the total effect of all the fields so generated on the magnetometer system depends upon the relative orientation of total induced field, and the earth's magnetic field. As pointed out in my prior application S. N. 547,447 filed July 31, 1944, and as shown in Fig. 3 of the drawing of the instant specification the total induced magnetic field $H_I$ of an aircraft structure may be reproduced by a system of three suitable virtual bars T, L and V, oriented in chosen directions in respect to the aircraft along orthogonal axes $x'$, $y'$ and $z'$, parallel respectively to the transverse, longitudinal and vertical axes $x$, $y$ and $z$ of the aircraft, as seen in Fig. 1. The three virtual bars mentioned above may be chosen in this fashion, so that one of them is parallel to each of these reference axes, the bar parallel to the $x$ axis being designated the transverse bar, that parallel to the $y$ axis being designated the longitudinal bar, and that parallel to the $z$ axis being designated the vertical bar.

Since the three virtual bars just defined do not in general lie on the reference axes $x$, $y$ and $z$, but are only parallel to them, each of them may under these circumstances itself produce magnetic field components along the other reference axes. These components must also be compensated if proper overall compensation is to be obtained. It is convenient to introduce a nomenclature in accordance with which the direction of the bar causing a field component as well as the direction of the component caused by that bar is designated. Accordingly, a double-letter system is used in which the first letter indicates the orientation of the bar causing the field component and the second letter indicates the direction of the component caused thereby. Thus the transverse bar which produces components in the transverse, longitudinal and vertical directions may result in components designated as TT, TL and TV. Similarly, there will be other components designated LL, LV, LT, VV, VL and VT. The components acting along each of the three reference axes of Fig. 3 have been indicated in Fig. 1.

The nature of each of the virtual bars T, L, and V required to produce the induced field of the aircraft depends upon the size, distribution and other characteristics of the soft magnetic members which produce the total induced magnetic field $H_I$, and the total field induced in them depends upon the relative orientation of the bars and the earth's magnetic field. Consequently, it is convenient to introduce direction angles X, Y and Z which measure respectively the orientations of the $x$, $y$ and $z$ axes in relation to the direction of the earth's magnetic field shown in Fig. 1 by the heavy arrow designated H.

The total induced magnetic field $H_I$ of the aircraft, as seen in Fig. 3 is then equal to the sum of the fields induced in the three virtual bars and may be written $$H = H \begin{pmatrix} (TT \cos X + LT \cos Y + VT \cos Z)i \\ (TL \cos X + LL \cos Y + VL \cos Z)j \\ (TV \cos X + LV \cos Y + VV \cos Z)k \end{pmatrix} \quad (1a)$$

where $i$, $j$ and $k$ are the unit vectors along the $x$, $y$ and $z$ axes, respectively.

Of the total induced field, only the component in the direction of the earth's magnetic field affects the operation of a magnetometer arranged to measure components in the direction of the earth's magnetic field. Consequently the effect of the induced magnetic field $H_{ID}$ acting on the magnetometer system may be expressed by resolving the field of equation (1a) in the direction of the earth's magnetic field, resulting in an expression of the following form:

$$H_{ID} = H \begin{pmatrix} TT \cos^2 X + (LT+TL) \cos X \cos Y + \\ LL \cos^2 Y + (VT+TV) \cos X \cos Z + \\ (LV+VL) \cos Y \cos Z + VV \cos^2 z \end{pmatrix} \quad (2)$$

Magnetic fields due to eddy currents may, to a first approximation, be considered due only to the conducting sheets forming the wings of the aircraft. Since the eddy-current field depends upon the rate of change of flux normal to the conducting sheet, it will be seen that the induced field $H_E$ depends upon the first time derivative of the field components along the vertical axis, or $$H_E = E\frac{dH_z}{dt} = E\frac{d(H \cos Z)}{dt} \quad (3)$$

Examination of the three equations (1), (2), and (3) given above indicates that the expressions for all of the components of the several magnetic fields to be compensated include some power of the cosine of one or more of the angles between the chosen reference axes and the earth's magnetic field and that the magnitude of the earth's magnetic field is multiplied in each case by a coefficient $P_x$, TT, etc., determined by the structural characteristics of the aircraft. Since the magnetometer system provides a direct-current output proportional to the field in the direction of the magnetometer elements, this output will contain voltages having the form of each of these expressions, these voltages constituting the spurious signals which interfere with the proper use of the equipment.

In accordance with the present invention, means are provided for generating voltages proportional to each of the components of the aircraft's magnetic field and for introducing these voltages into the magnetometer system to cancel out the voltages produced therein by the field components. This system is illustrated in Fig. 2, in which there is shown a magnetometer system comprising magnetometer elements 12, and a detector-amplifier 14. A system of wide-latitude detectors similar to those disclosed in copending application, Serial No. 547,447, filed July 31, 1944, Compensation of Induced Magnetization, Walter E. Tolles, is mounted in the aircraft and arranged to measure the component of the earth's magnetic field along each of the chosen reference axes. Thus detector 16 measures the field along the $x$ axis, detector 18 that along the $y$ axis and detector 20 that along the $z$ axis. These field components produce output voltages in the three detectors which are proportional respectively to $(H \cos X)$, $(H \cos Y)$ and $(H \cos Z)$. It will be recognized that, if the outputs of detectors 16, 18 and 20 are properly operated upon, the arguments of each of the terms of equations (1), (2) and (3) above may be obtained. Consequently, the output of detector 16 is fed through an attenuator 22, by which constant coefficient $P_x$ may be introduced, while the outputs of detectors 18 and 20 are fed respectively through attenuators 24 and 26 by means of which constant coefficients $P_y$ and $P_z$ may be introduced. This procedure produces voltages proportional to the three terms of equation (1) and these are, as indicated in Fig. 2, introduced into detector-amplifier 14 at any convenient place in its circuit, the only requirement being that filtering or phase-shifting action produced by the amplifier in these voltages be the same as that produced by the amplifier in the output of magnetometer elements 12.

Compensation of induced fields requires generation of voltages proportional respectively to $(H \cos X \cos Y)$, $(H \cos X \cos Z)$, $(H \cos Y \cos Z)$, $(H \cos^2 X)$, $(H \cos^2 Y)$ and $(H \cos^2 Z)$. These voltages may be obtained through the use of suitable product-taking devices, as for example the calculating device disclosed by L. Martin in the prior U. S. Patent No. 2,244,369, dated June 3, 1941, from the voltages generated by detectors 16, 18 and 20. Thus the output of detector 16 is fed simultaneously to squaring circuit 28 and product-taking circuits 30 and 32. Similarly the output of detector 18 is fed to squaring circuit 34 and product-taking circuits 32 and 36, while the output of detector 20 is fed to squaring circuit 38 and product-taking circuits 30 and 36. The outputs of each of the product-taking circuits and the squaring circuits are fed to attenuators 40, by means of which the coefficients indicated in Fig. 2 are introduced, thus giving voltages of exact form required for compensation of the various components of induced field. These voltages are also introduced to detector-amplifier 14.

Compensation of the field due to eddy currents in the wings of the aircraft is effected by differentiating the output of detector 20 in differentiating circuit 42 and attenuating the output thereof in attenuator 44. The output of attenuator 44 is also introduced into detector-amplifier 14. Any differentiating circuit may be used which will have an output proportional to the rate of change of the earth's magnetic field's component along the $z$ axis in the aircraft ($H \cos Z$), when supplied with a voltage proportional to said component by the output of detector 20.

In order to effect compensation of the aircraft using the system of the invention, the several attenuators must be adjusted using any desired system of measurement and analysis, as for example flight maneuvers and ground measurements by means of which the compensation of the individual components may be determined. It may in some cases be necessary to reverse the output polarity of one or more attenuators, and this may be achieved by means of suitable reversing switches, not shown.

Having thus fully described my invention, I claim:

1. In combination with an aircraft-mounted magnetometer system arranged to produce a direct-current output proportional to the intensity of a magnetic field to be measured; means for generating voltages proportional to individual components of disturbing magnetic fields of the aircraft along the transverse, longitudinal and vertical axes of said aircraft; attenuator means connecting the output of the voltage generating means to said magnetometer system for providing voltages thereto proportional to the permanent magnetic field of said aircraft along said axes; separate squaring circuit means connected to the voltage generating means along each of said axes; attenuator circuit means connecting each of said squaring circuit means to said magnetometer elements; first product taking circuit means connected to receive the voltage output from the voltage generating means along the transverse and vertical axes, second product taking circuit means connected to receive the voltage output from the voltage generating means along the vertical and longitudinal axes, and third product taking circuit means connected to receive the voltage output from the voltage generating means along the transverse and longitudinal axes; said first, second and third product taking circuits being connected through individual attenuator means to said magnetometer system, all said product taking circuits and said squaring circuits providing voltages to said magnetometer system proportional to the induced magnetic field along said axes, and a differentiating circuit connected to the voltage generating means along said vertical axis and to said magnetometer system through attenuation means, the voltage from said last named attenuation means being proportional to the eddy circuits along said vertical axis.

2. Apparatus as in claim 1 wherein the output from each of said attenuating means is applied through a common connection to said magnetometer system to cancel out the voltages caused by the magnetic field of the aircraft.

3. Apparatus as in claim 2 wherein said means for generating voltages proportional to individual components of disturbing magnetic fields of the aircraft along the transverse, longitudinal and vertical axes of said aircraft includes a plurality of magnetometers, each of said magnetometers including a coil, there being a separate magnetometer for each of the three-axes with the core of the magnetometer for each axis being arranged with its axis along the axis on which the magnetometer is placed.

References Cited in the file of this patent

UNITED STATES PATENTS

| | | |
|---|---|---|
| Re. 21,970 | Bechberger | Dec. 9, 1941 |
| 1,362,612 | Espenschied | Dec. 21, 1920 |
| 1,892,826 | Bettison et al. | Jan. 3, 1933 |
| 2,252,059 | Barth | Aug. 12, 1941 |
| 2,308,566 | Noxon | Jan. 19, 1943 |
| 2,346,830 | De Lanty | Apr. 18, 1944 |
| 2,412,617 | Jenkins | Dec. 17, 1946 |
| 2,468,554 | Hull | Apr. 26, 1949 |
| 2,468,968 | Felch et al. | May 3, 1949 |

OTHER REFERENCES

Burt et al., A. I. E. E. Technical Paper 44–7. December 1943, pages 1–4.